United States Patent
Raman et al.

(10) Patent No.: US 8,249,069 B2
(45) Date of Patent: Aug. 21, 2012

(54) FORWARDING MULTI-DESTINATION PACKETS IN A NETWORK WITH VIRTUAL PORT CHANNELS

(75) Inventors: Pirabhu Raman, San Jose, CA (US); Dinesh Dutt, Sunnyvale, CA (US); Mahesh Maddury, San Jose, CA (US); Subbarao Arumilli, Santa Clara, CA (US); Vijay Rangarajan, Fremont, CA (US); Ray Kloth, Saratoga, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 12/798,131

(22) Filed: Mar. 30, 2010

(65) Prior Publication Data

US 2011/0243136 A1 Oct. 6, 2011

(51) Int. Cl.
*H04L 12/28* (2006.01)
(52) U.S. Cl. ........................................ 370/390; 370/401
(58) Field of Classification Search .................. 370/254, 370/255, 360, 389, 390, 392, 401
See application file for complete search history.

(56) References Cited

U.S. PATENT DOCUMENTS

| | | | |
|---|---|---|---|
| 6,556,575 B1 * | 4/2003 | Denio et al. | 370/401 |
| 7,720,055 B2 * | 5/2010 | Kadambi et al. | 370/389 |
| 2002/0071386 A1 | 6/2002 | Gronke | |
| 2008/0267179 A1 * | 10/2008 | LaVigne et al. | 370/389 |
| 2009/0103566 A1 | 4/2009 | Kloth et al. | |
| 2010/0008375 A1 | 1/2010 | Lee et al. | |
| 2010/0202452 A1 * | 8/2010 | Ram et al. | 370/390 |

* cited by examiner

*Primary Examiner* — Hong Cho
(74) *Attorney, Agent, or Firm* — Cindy Kaplan (57) ABSTRACT

In one embodiment, a method includes receiving a multi-destination packet at a switch in communication with a plurality of servers through a network device, identifying a port receiving the multi-destination packet at the switch or a forwarding topology for the multi-destination packet, selecting a bit value based on the identified port or forwarding topology, inserting the bit value into a field in a virtual network tag in the multi-destination packet, and forwarding the multi-destination packet with the virtual network tag to the network device. The network device is configured to forward the multi-destination packet to one or more of the servers based on the bit value in the multi-destination packet. An apparatus for forwarding multi-destination packets is also disclosed.

20 Claims, 8 Drawing Sheets

FORWARDING MULTI-DESTINATION PACKETS IN A NETWORK WITH VIRTUAL PORT CHANNELS

BACKGROUND

The present disclosure relates generally to communication networks, and more particularly, to forwarding multi-destination packets in a network with virtual port channels.

Networks such as data centers often use a small percentage of available CPU, storage, and memory capacity. This results in deployment of more servers than are necessary to perform a specified amount of work. Additional servers increase costs and create a more complex and disparate environment that can be difficult to manage. Many network managers are turning to virtualization so that resources can be shared across a network. Virtualization is a technology which allows one computer to do the job of multiple computers by sharing resources of a single computer across multiple systems. Virtualization allows servers to be decoupled from underlying hardware, thus resulting in multiple virtual machines sharing the same physical server hardware.

The servers are coupled to the network via one or more access layer switches. There may also be one or more interface virtualizers (also referred to as Fabric Extender (FEX) or remote replicator) interposed between the switches and servers. Since the server may be connected to more than one interface virtualizer (e.g., at a virtual port channel), it is important to prevent transmittal of duplicate packets to the server.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving a multi-destination packet at a switch in communication with a plurality of servers through a network device, identifying a port receiving the multi-destination packet at the switch or a forwarding topology for the multi-destination packet, selecting a bit value based on the identified port or the forwarding topology, inserting the bit value into a field in a virtual network tag in the multi-destination packet, and forwarding the multi-destination packet with the virtual network tag to the network device. The network device is configured to forward the multi-destination packet to one or more of the servers based on the bit value in the multi-destination packet.

In another embodiment, an apparatus generally comprises a plurality of ports for communication with a plurality of servers, each of the ports connected to a network device located in a communication path between the apparatus and two or more of the servers. The apparatus further comprises a processor for identifying each output port at the network device as a designated forwarder or a non-designated forwarder, configuring a mask for the network device, and forwarding multi-destination packets received at the apparatus to the network devices. The mask is applied to an output interface list at the network device to filter packets at the non-designated forwarder output ports.

In yet another embodiment, an apparatus generally comprises one or more network facing ports, each of the network facing ports for communication with a switch, and a plurality of server facing ports, each of the server facing ports for communication with a server. The apparatus further comprises a processor for applying a mask to an output interface list comprising the server facing ports to filter multi-destination packets at one or more of the server facing ports. The mask is configured based on information received from the switch.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the embodiments. Thus, the embodiments are not to be limited to the embodiments shown, but are to be accorded the widest scope consistent with the principles and features described herein. For purpose of clarity, features relating to technical material that is known in the technical fields related to the embodiments have not been described in detail.

Virtualization allows one computer to do the job of multiple computers by sharing the resources of a single computer across multiple systems. Through the use of virtualization, multiple operating systems and applications can run on the same computer at the same time, thereby increasing utilization and flexibility of hardware. Software is used to virtualize hardware resources of a computer, including, for example, a CPU (central processing unit), RAM (random access memory), hard disk, and network controller, to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. Virtualization thus enables the aggregation of multiple servers, storage infrastructure, and networks into shared resources that can be delivered dynamically to applications as needed.

As described in detail below, the servers communicate with a network via access layer switches. The server may be connected to the switches via more than one link (e.g., at a virtual Port Channel (vPC)). In many cases, multiple links may be active at the same time (i.e., active-active topology). In conventional systems, this results in a reduction in the number of multicast indices available in the network, where each multicast index points to a specific set of output interfaces.

VNTag (Virtual Network Tag) is an example of a networking data frame header that can be used by switches in a virtual network environment. The VNTag enables a virtual machine port to be logically attached to the network so that it can be managed similar to a physical port. In a network with an active-active topology, it is not always feasible to scale all network devices in the VNTag hierarchy to match the switch. One or more of the embodiments described herein allow the full space supported by network devices (e.g., Fabric Extenders (FEXs)) to be accessible with or without active-active topologies.

In topologies where the FEX is connected to the switch via one or more virtual port channels (vPCs), conventional systems maintain different sets of OIF (Output Interface) lists on the FEX. One or more of the embodiments described herein simplify OIF management by filtering multi-destination packets at one of the FEXs, based on a mask configured at the switch, thereby removing the need for OIF rewrite following a link failure and improving network convergence.

The embodiments described herein operate in the context of a data communication network including multiple network elements. Some of the elements in a network that employs the embodiments may be network devices such as switches, routers, fabric extenders, servers, or hosts. The network device may include, for example, a master central processing unit, interfaces, and a bus. The CPU preferably includes memory and a processor. The network device may be implemented on a general purpose network machine such as described below with respect to FIG. 8.

Figure 1:
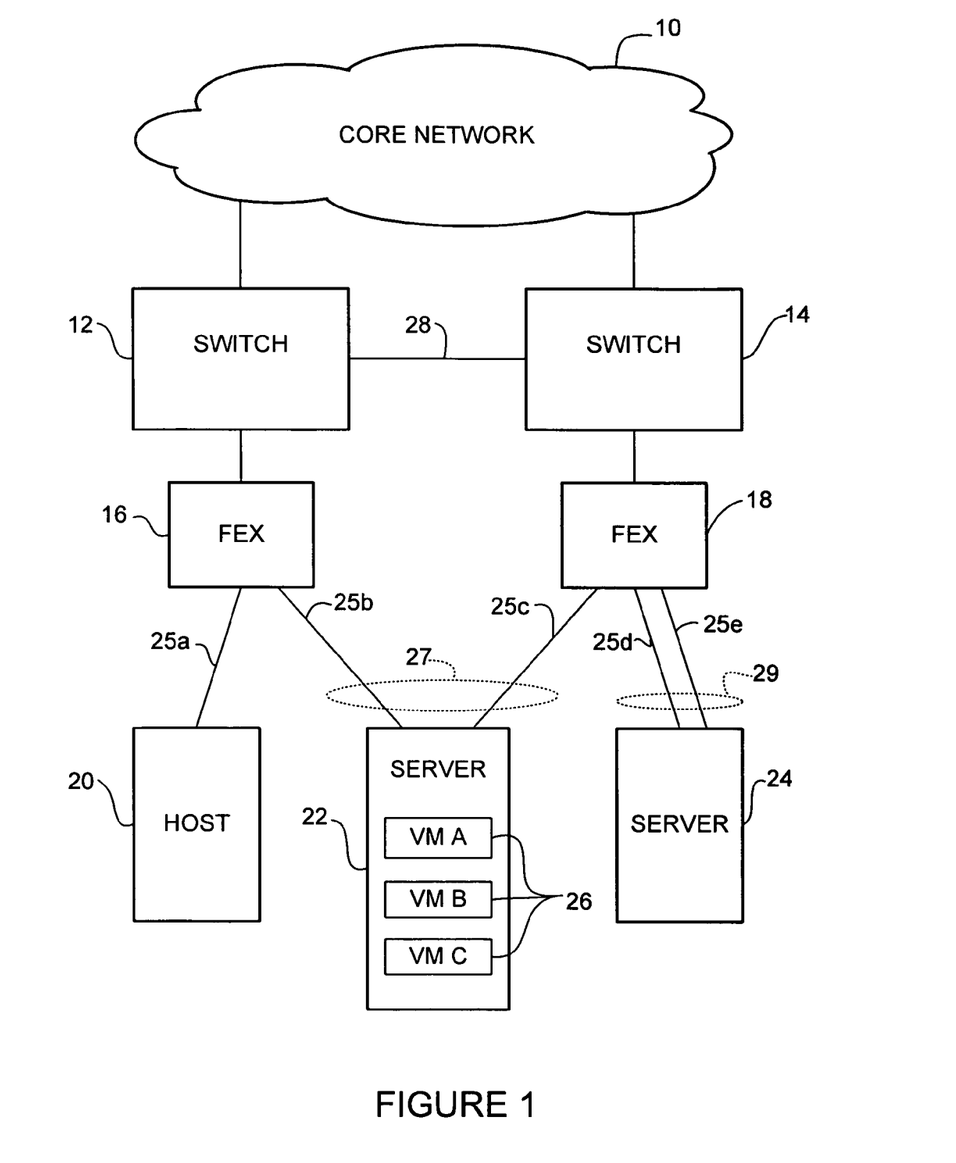
FIG. 1 illustrates an example of a network in which embodiments described herein may be implemented.

Referring now to the drawings, and first to FIG. 1, an example of a network that may implement embodiments described herein is shown. The network may be configured for use as a data center or any other type of network. The network shown in FIG. 1 includes network devices 12, 14 in communication with a core network 10 (e.g., Layer 3 (L3) network). The network devices 12, 14 may be hardware implemented network switches or other network devices configured to perform switching or routing functions. For example, the network device 12, 14 may be a NEXUS 5000 or NEXUS 7000 switch available from Cisco Systems, Inc. of San Jose, Calif. In one example, the network devices 12, 14 are access layer switches (e.g. NEXUS 5000) and are in communication with one or more aggregation layer switches (e.g., NEXUS 7000) (not shown). A Multi-Chassis Trunk (MCT) (also referred to as a peer-link) 28 connects the two peer switches 12, 14.

Switches 12 and 14 are each connected to an FEX (Fabric Extender) 16, 18 (also referred to as a remote replicator or an interface virtualizer). Each FEX 16, 18 is in communication with one or more servers or hosts. As shown in FIG. 1, FEX 16 is connected to host 20 via link 25a and server 22 via link 25b. FEX 18 is connected to server 22 via link 25c and server 24 via links 25d and 25e. The multiple ports at the server may be grouped as a virtual Port Channel (vPC). For example, as shown in FIG. 1, ports at server 22 connected to links 25b and 25c are grouped as vPC 27. Ports at server 24 connected to links 25d and 25e are grouped as vPC 29.

In the example shown in FIG. 1, server 22 includes a plurality of virtual machines (VM A, VM B, VM C) 26. The virtual machines 26 share hardware resources without interfering with each other, thus enabling multiple operating systems and applications to execute at the same time on a single computer. A virtual machine monitor (not shown) may be used to dynamically allocate hardware resources to the virtual machines 26.

Figure 2:
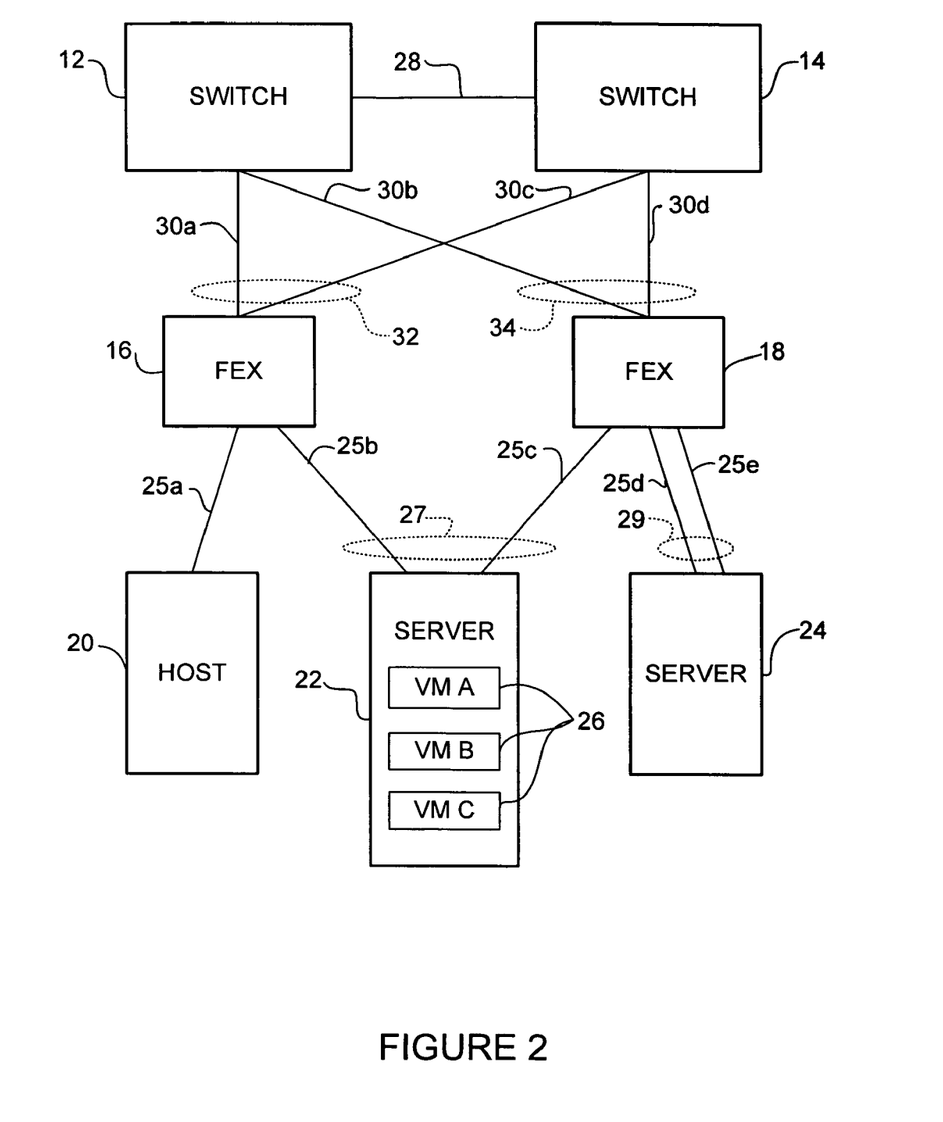
FIG. 2 illustrates the network of FIG. 1 with Fabric Extenders (FEXs) dually connected to switches with virtual port channels.

FIG. 2 illustrates the network of FIG. 1 with multiple links connecting the FEXs 16, 18 to the switches 12, 14. Switch 12 is connected to FEX 16 via link 30a and to FEX 18 via link 30b. Switch 14 is connected to FEX 16 via link 30c and to FEX 18 via link 30d. The ports at each FEX 16, 18 are grouped together in a vPC 32, 34.

It is to be understood that the simplified networks shown in FIGS. 1 and 2 are only examples, and that the embodiments described herein may be employed in networks having different configurations and types of network devices. For example, multiple layers of FEXs (i.e., cascaded FEXs) may be used and the FEXs may be in communication with any number of servers including any number of virtual machines. It is to be understood that the term 'server' as used herein may refer to a conventional server, a server comprising virtual machines, or a host.

Referring again to FIG. 1, forwarding decisions based on a MAC (Media Access Control) address of a packet received from the network 10 are made at the switch 12, 14. In one embodiment, the switch 12, 14 sets a bit (referred to herein as an e-bit) in a VNTag frame within a multi-destination packet before forwarding the packet to the FEX 16, 18. The FEX 16, 18 uses the information in the VNTag to forward the packet to the correct servers, hosts, or virtual machines. This prevents delivery of duplicate packets and eliminates the need to synchronize Destination Virtual Interface (DVIF) assignments between switches 12, 14.

Figure 3:
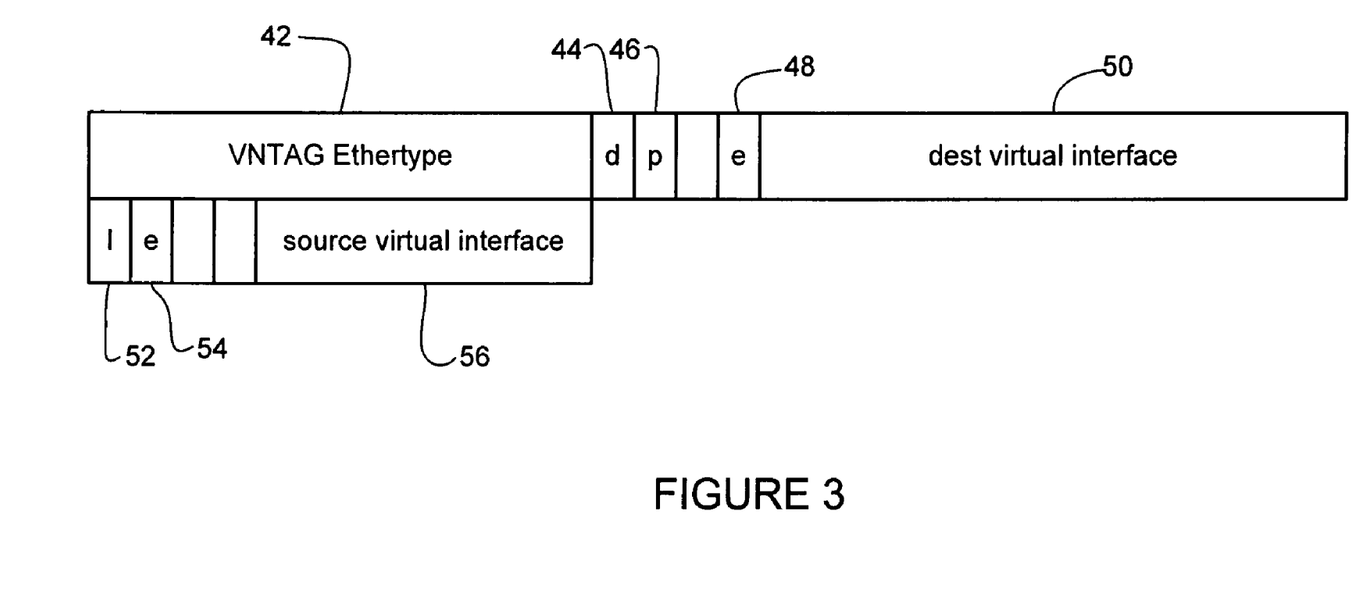
FIG. 3 illustrates an example of a frame format for a virtual network tag used in forwarding packets in the network of FIG. 1.

FIG. 3 illustrates one example of a VNTag format. A VNTag Ethertype field 42 identifies the VNTag. Field 44 (d) contains the direction and indicates whether the frame is travelling from the FEX 16, 18 to the switch 12, 14 or from the switch to the FEX. Field 46 (p) is a pointer and indicates whether a DVIF (Destination Virtual Interface) list is included in the tag or a virtual interface ID is included in the frame. The embodiments described herein are for multi-destination packets, therefore this field will have p=1 to indicate that the tag includes a list. A destination virtual interface field 50 identifies a list of downlink ports to which the frame is to be forwarded. Field 52 (looped (l)) indicates whether the frame is a multicast frame that was forwarded out the bridge port on which it was received. In this case, the FEX checks the source virtual interface and filters the frame from the corresponding port. The source virtual interface in field 56 is the ID of the downlink port that received the frame from the VNIC (virtual network interface card) (i.e., the port that added the VNTag).

In one embodiment, a new bit is added to the VNTag frame. The bit is referred to herein as an 'e-bit' and may be located in field 48 or field 54 (reserved field), for example. In one embodiment, a hardware implemented mask is used so that the e-bit can be turned on or off. As described in detail below, the e-bit is set by the switch 12, 14 and used by the FEX 16, 18 to implement a masking function to prevent duplicate packets from being transmitted to the destination host/server. The masking function supports orphan ports (i.e., a port connected to one FEX via a single link (e.g., host 20 in FIG. 1)). All intermediate devices transparently forward the e-bit. All FEX devices in a cascaded tree preferably implement the masking logic. If an adapter is connected via pinning, it relies on the previous FEX to implement the masking logic.

It is to be understood that the frame format shown in FIG. 3 is only one example and that other formats may be used without departing from the scope of the embodiments. Also, frames other than a VNTag may be used.

Figure 4:
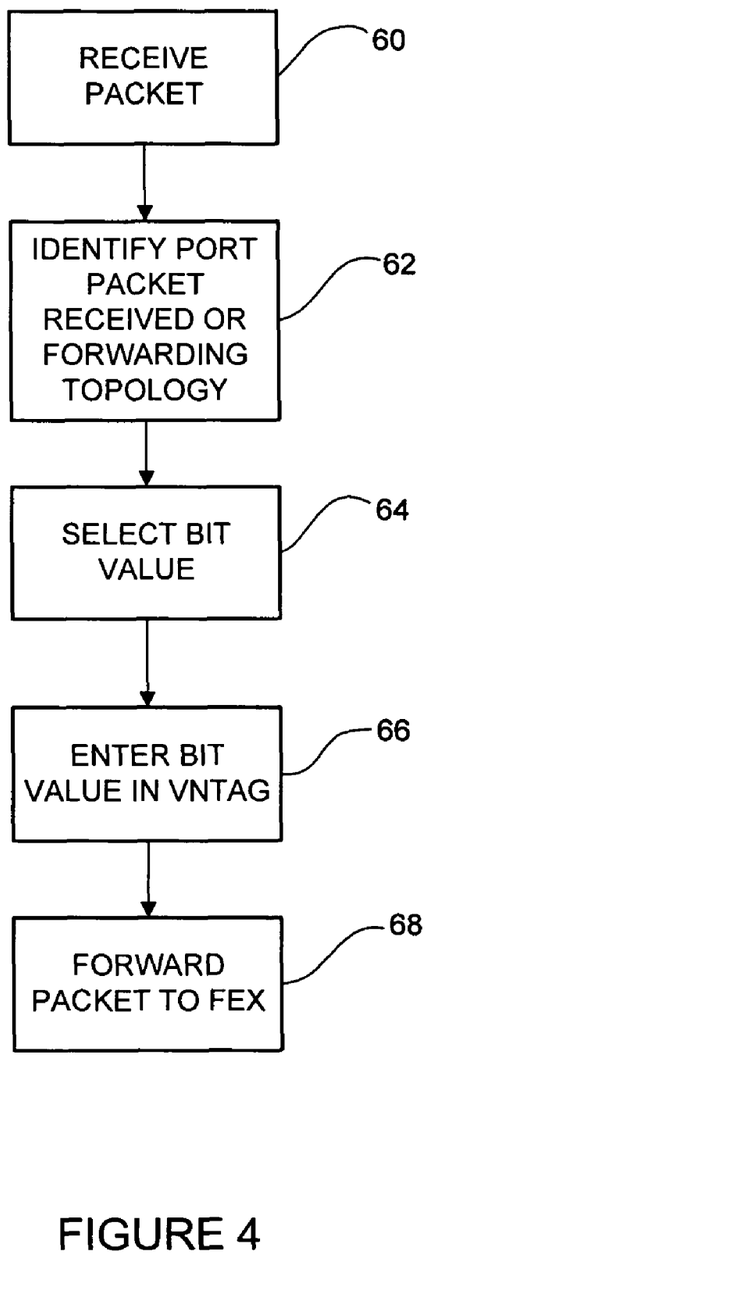
FIG. 4 is a flowchart illustrating a process at the switch for forwarding multi-destination packets in the network of FIG. 1, in accordance with one embodiment.

FIG. 4 is a flowchart illustrating a process at the switch 12, 14 for forwarding multi-destination packets in a network, in accordance with one embodiment. At step 60 switch 12, 14 receives a packet from core network 10 (FIGS. 1 and 4). The switch 12, 14 is in communication with a plurality of servers 20, 22, 24 through network device (FEX) 16, 18. The switch 12, 14 identifies the port at which the packet was received (core network 10 or peer switch) or identifies a forwarding topology for the packet (step 62). Based on either where the packet was received from or the forwarding topology, the switch 12, 14 selects a bit value (e.g., e=0, e=1) and inserts the value in a virtual network tag (steps 64 and 66). The packet is then forwarded to the FEX 16, 18 (step 68). The e-bit is configured to indicate to the FEX on which output ports to forward the packet. In one embodiment, the FEX includes a mask programmed to point to all dual connected interfaces. The mask is applied based on the bit value in the VNTag.

Figure 5:
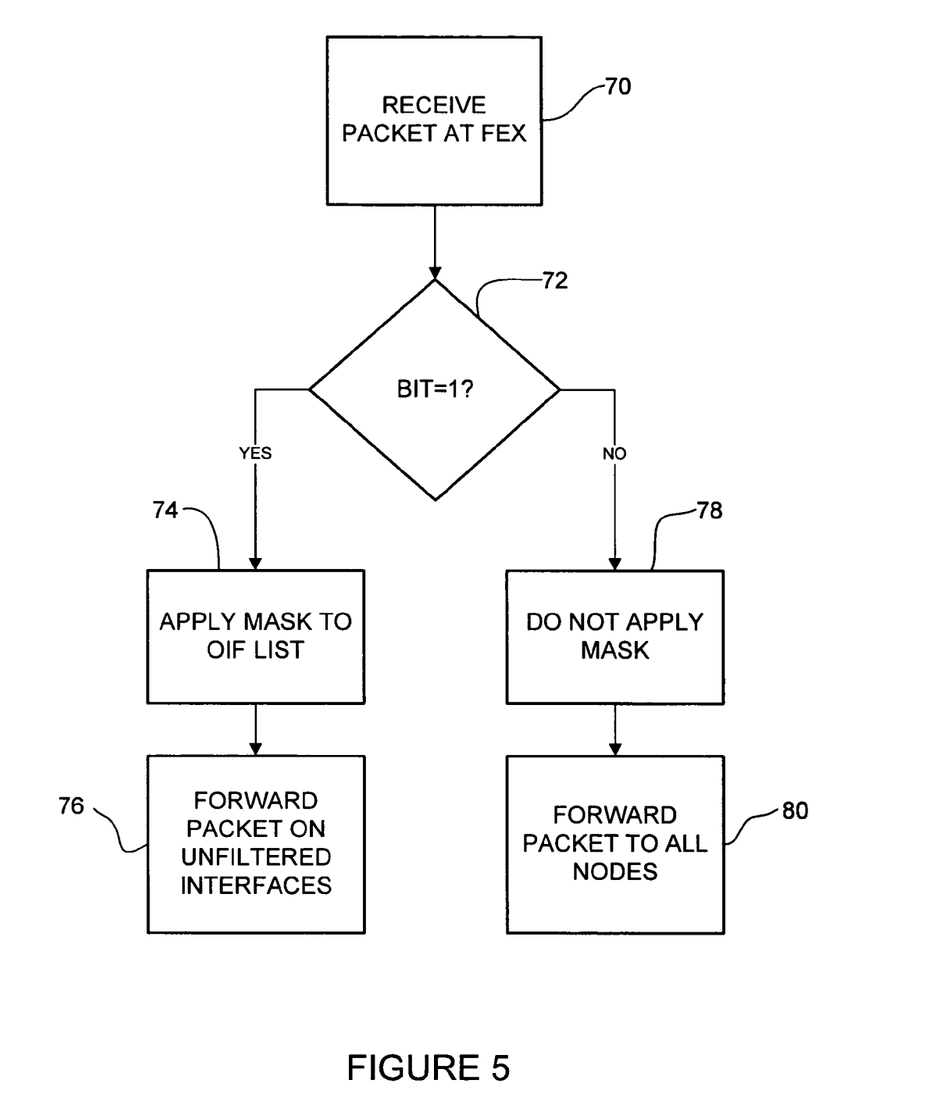
FIG. 5 is a flowchart illustrating a process at the FEX for forwarding multi-destination packets in the network of FIG. 1, in accordance with one embodiment.

FIG. 5 is a flowchart illustrating a process for forwarding the multi-destination packet received from the switch 12, 14 at the network device (e.g., FEX 16, 18), in accordance with one embodiment. The FEX 16, 18 includes one or more network facing ports (i.e., ports connected to the core network 10 in FIGS. 1 and 2) and a plurality of server facing ports (i.e., ports connected to the hosts/servers/virtual machines). The FEX 16, 18 also includes a mask configured by the switch 12, 14. The mask may be programmed to point to all dual connected ports (e.g., ports connected to links 25b, 25c, 25d, and 25e in FIG. 1). At step 70, the FEX 16, 18 receives a multi-destination packet. The FEX 16, 18 looks at the VNTag to determine the bit value (step 72). In one embodiment, if the e-bit=1, the FEX 16 applies the mask to an output interface list containing the server facing ports to filter packets at one or more the server facing ports (step 74). The packet is then forwarded on unfiltered interfaces (e.g., orphan node 20) (step 76). If the e-bit=0, the mask is not applied (step 78) and the packet is forwarded to all nodes (e.g., host 20 and server 22) (step 80).

The following describes an example for forwarding multi-destination packets at the switch 12 in the network shown in FIG. 1. A multi-destination packet arrives at switch 12 destined for host 20, server 24, VM A, VM B, and VM C 26. In this example, VM A is only connected to FEX 18, while VM B and VM C are dual connected to both FEX 16 and FEX 18. Switch 12 forwards the packet with a primary VNTag to FEX 16 with the e-bit=0. The primary VNTag is destined for switch 14, host 20, VM B, and VM C. FEX 16 forwards the packet to host 20, VM B, and VM C. Switch 12 also forwards the packet with the primary VNTag to switch 14. Switch 14 forwards the packet with an alternate VNTag destined for server 24 and VM A. Since the packet was received on the peer link 28, the switch 14 sets the e-bit=1 in the VNTag frame. When FEX 18 receives the packet with the e-bit=1, it applies the mask to filter dual connected interfaces (e.g., VM B, VM C). FEX 18 forwards the packet only to server 24 and VM A. This eliminates the receipt of duplicate packets at the virtual machines 26, which are in communication with both FEX 16 and FEX 18.

The above example describes an Ethernet network in which the peer link is used to forward packets between the switches 12, 14. In another example, Layer 2 Multipath (L2MP) technology is used (e.g., DCE (Data Center Ethernet) or TRILL (TRansparent Interconnection of Lots of Links)). For these applications, an identifier is used to indicate different routes in the network. In one embodiment, an FTag (Forwarding Tag) identifies the forwarding topology assigned to a given frame. In this case, the switch 12, 14 sets the e-bit based on the FTag associated with the packet.

In one example, FTag1 is assigned to a topology including links 25a, 25c, and 25e, while FTag2 is assigned to a topology including links 25a, 25b, and 25d (FIG. 1). At switch 12, a packet with FTag1 destined for host 20, server 22, and server 24 will have the e-bit set equal to one so that FEX 16 forwards the packet only to orphan host 20 (via link 25a). At switch 14, a packet assigned FTag1 and destined for host 20, server 22, and server 24 will have the e-bit equal to zero so that FEX 18 forwards the packet to server 22 (via link 25c) and server 24 (via link 25e). Thus, the e-bit is set at the switch based on the assigned FTag.

In another embodiment, a mask is used to filter multi-destination packets where the FEXs 16, 18 are connected via virtual port channels to the switches 12, 14, as illustrated in FIG. 2. A global mask is defined on each of the FEXs 16, 18 and contains only the dual connected ports for which the FEX is configured as a non-DF (Designated Forwarder) FEX. The global mask is applied for all multi-destination packets (p=1 in VNTag header).

The mask is used to filter multi-destination packets on non DF-FEX ports, which eliminates the need to maintain separate copies of a DVIF table on each FEX. This eases software implementation since the same copy of the OIF table can be maintained on both of the FEXs. It also improves convergence on link failures as the OIF table does not need to be changed and only the global mask needs to be updated.

A global mask is configured at the switch and provided for each FEX 16, 18. The mask contains all dual connected ports for the FEX that are configured as the non-DF FEX. The mask is applied to the OIF list. The logic applies only to multi-destination frames (p=1). In case of a link failure, only the mask in non DF-FEX needs to be updated. The FEX forwarding table (DVIF) entries are the same on both the FEXs.

The global mask embodiment may also be used to load balance. The mask may be populated to load balance based on the RBH (Result Bundle Hash) across two FEXs. In one embodiment, the RBH value is calculated locally within the FEX and both FEXs use the same algorithm for calculating RBH. An alternative is to reserve a bit in VNTag and pass it from the switch and have two masks.

Figure 6:
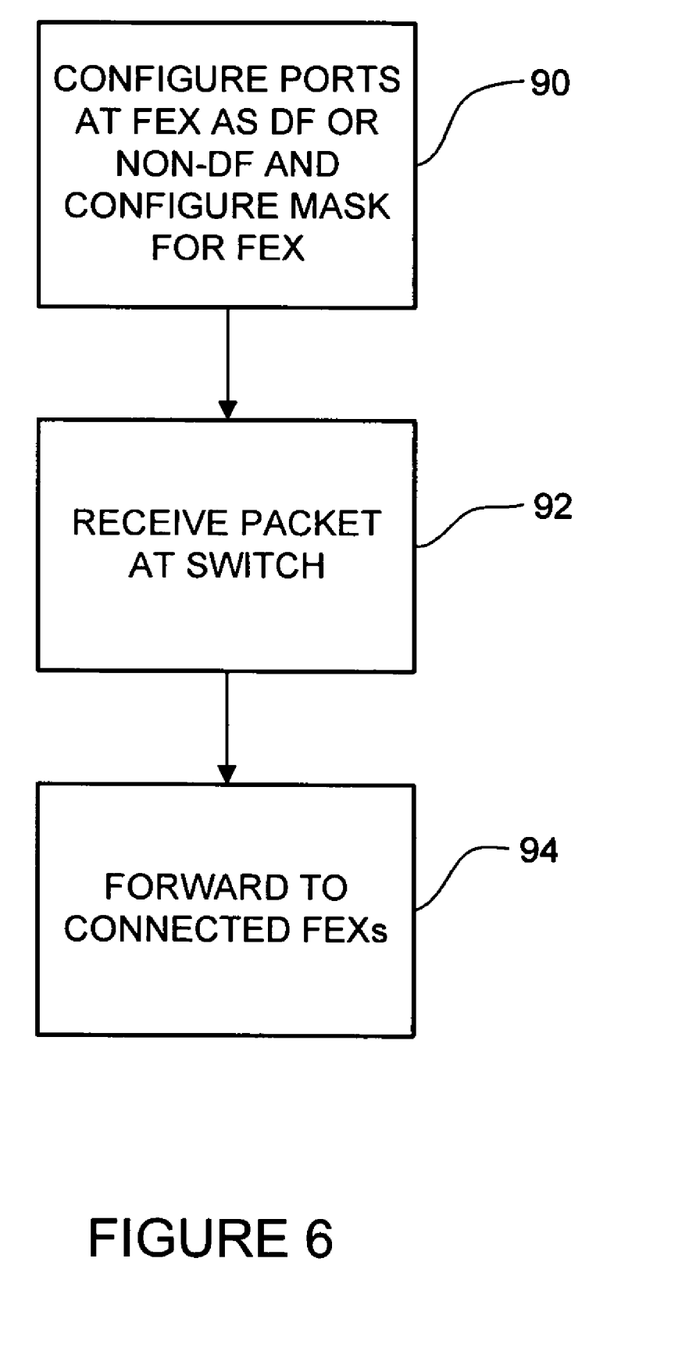
FIG. 6 is a flowchart illustrating a process at the switch for forwarding multi-destination packets in the network of FIG. 2, in accordance with one embodiment.

FIG. 6 is a flowchart illustrating a process for forwarding multi-destination packets at a switch connected to multiple FEXs, in accordance with one embodiment. At step 90, the switch 12, 14 designates each output port at the FEX 16, 18 as a DF or non-DF and configures a mask for the FEX (FIGS. 2 and 6). The switch 12, 14 receives a multi-destination packet and forwards the packet to the FEXs 16, 18 (step 92 and 94).

Figure 7:
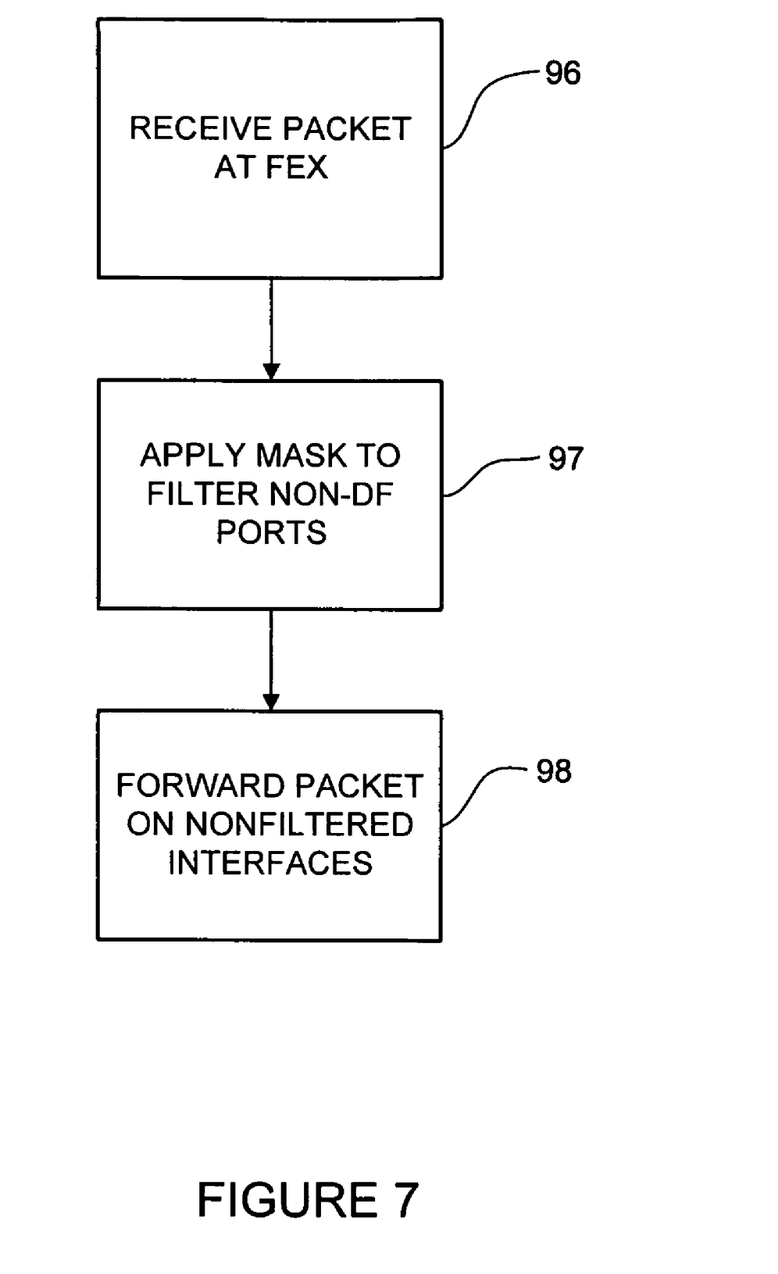
FIG. 7 is a flowchart illustrating a process at the FEX for forwarding multi-destination packets in the network of FIG. 2, in accordance with one embodiment.

FIG. 7 is a flowchart illustrating a process for forwarding multi-destination packets at the FEX in FIG. 2, in accordance with one embodiment. At step 96, the FEX 16, 18 receives a multi-destination packet from the switch 12, 14. The FEX 16, 18 applies the mask that was previously configured by the switch 12, 14 (step 97). The mask is applied to the output interface list at the FEX to filter packets at the non-DF output ports. The FEX 16, 18 forwards the packets on non-filtered ports (step 98).

It is to be understood that the processes illustrated in the flowcharts of FIGS. 4, 5, 6, and 7 are only examples, and that steps may be added, removed, or reordered, without departing from the scope of the embodiments.

In the following example, FEX 16 is the non-DF for the dual connected port at link 25b. FEX 18 is the DF for the dual connected ports at link 25C and 25d, and the non-DF for the port at link 25e. The mask FEX 16 contains the output interface for link 25b. The mask at FEX 18 contains the output interface for link 25e. The mask is applied to the output interface list and filters the multi-destination packets at the non-designated forwarder. For example, if a packet is received at FEX 16, it will forward the packet only to the orphan node (host 20) since it is a non-DF for the port connected to link 25b. When FEX 18 receives the same packet, it forwards it to server 22 (via link 25c) and server 24 (via link 25d), since it is a DF for these dually connected ports.

Figure 8:
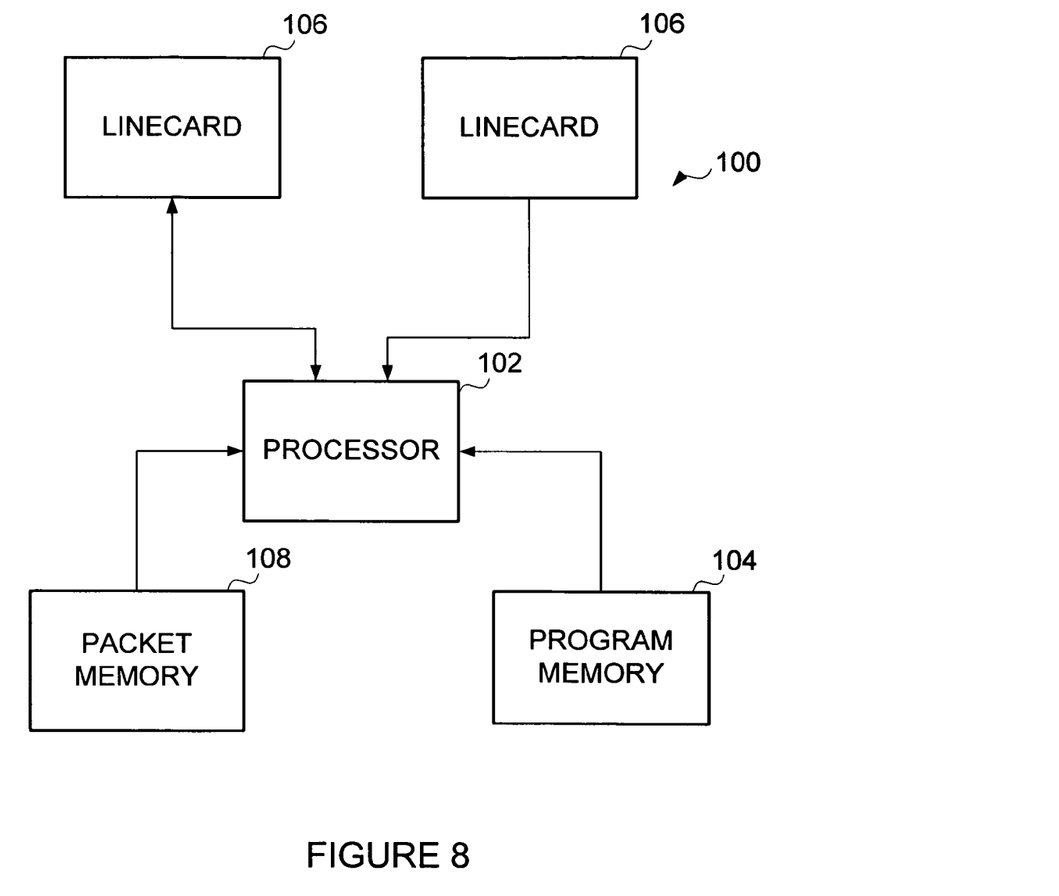
FIG. 8 is a block diagram illustrating an example of a network device useful in implementing embodiments described herein.

FIG. 8 depicts a network device 100 that may be used to implement embodiments described herein. Network device 100 is configured to implement all of the network protocols and extensions thereof described herein. In one embodiment, network device 100 is a programmable machine that may be implemented in hardware, software, or any combination thereof. Logic may be encoded in one or more tangible media for execution by a processor. For example, processor 102 may execute codes stored in a program memory 104. Program memory 104 is one example of a computer-readable medium. Program memory 104 can be a volatile memory. Another form of computer-readable medium storing the same codes is a type of non-volatile storage such as floppy disks, CD-ROMs, DVD-ROMs, hard disks, flash memory, etc.

Network device 100 interfaces with physical media via a plurality of linecards (network interfaces) 106. Linecards 106 may incorporate Ethernet interfaces, DSL interfaces, Gigabit Ethernet interfaces, 10-Gigabit Ethernet interfaces, SONET interfaces, etc. As packets are received, processed, and forwarded by network device 100, they may be stored in a packet memory 108. To implement functionality according to the system, linecards 106 may incorporate processing and memory resources similar to those discussed above in connection with the network device as a whole. It is to be understood that the network device 100 shown in FIG. 2 and described above is only one example and that different configurations of network devices may be used.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
receiving a multi-destination packet at a switch in communication with a plurality of servers through a network device;
identifying a port receiving the multi-destination packet at the switch or a forwarding topology for the multi-destination packet;
selecting a bit value based on said identified port or said forwarding topology and inserting said bit value into a field in a virtual network tag in the multi-destination packet; and
forwarding the multi-destination packet with the virtual network tag to the network device, wherein the network device is configured to forward the multi-destination packet to one or more of the servers based on the bit value in the multi-destination packet.

2. The method of claim 1 wherein the network device is a fabric extender.

3. The method of claim 1 wherein the network device comprises a mask comprising ports at the network device connected to the servers comprising dual connected interfaces, and the network device applies the mask when the bit value in the multi-destination packet is set to a specified value.

4. The method of claim 1 wherein the multi-destination packet is received from an Ethernet network and identifying comprises identifying the port receiving the packet and determining if the packet was received from a peer switch.

5. The method of claim 4 wherein receiving the multi-destination packet comprises receiving the multi-destination packet from the peer switch and further comprising replacing the virtual network tag with an alternate virtual network tag.

6. The method of claim 1 wherein at least one of the servers comprises a plurality of virtual machines and wherein the network device is configured to forward the multi-destination packet to one or more of the virtual machines based on the bit value in the multi-destination packet.

7. The method of claim 1 wherein forwarding further comprises forwarding the multi-destination packet to a peer switch.

8. The method of claim 1 wherein the multi-destination packet is received from a Layer 2 Multi-Path network and identifying comprises identifying a forwarding topology for the multi-destination packet.

9. The method of claim 1 wherein at least one of the servers are in communication with the switch via a virtual port channel.

10. An apparatus comprising:
a plurality of ports for communication with a plurality of servers, each of the ports connected to a network device located in a communication path between the apparatus and two or more of said plurality of servers; and
a processor for identifying each output port at the network device as a designated forwarder or a non-designated forwarder, configuring a mask for the network device, and forwarding multi-destination packets received at the apparatus to the network device, wherein the mask is applied to an output interface list at the network device to filter packets at said non-designated forwarder output ports.

11. The apparatus of claim 10 wherein the network devices are fabric extenders.

12. The apparatus of claim 10 wherein one or more of the servers comprises a plurality of virtual machines.

13. The apparatus of claim 10 wherein the processor is further operable to configure a second mask and wherein the masks are configured for load balancing.

14. The apparatus of claim 10 wherein the processor is further operable to update the mask following a link failure.

15. An apparatus comprising:
one or more network facing ports, each of said network facing ports for communication with a switch;
a plurality of server facing ports, each of said server facing ports for communication with a server; and
a processor for applying a mask to an output interface list comprising said server facing ports to filter multi-destination packets at one or more of said server facing ports, wherein the mask is configured based on information received from the switch.

16. The apparatus of claim 15 wherein the apparatus is a fabric extender.

17. The apparatus of claim 15 wherein the processor is configured to apply the mask to said output interface list based on a bit value in a packet received from the switch.

18. The apparatus of claim 15 wherein the mask comprises said server facing ports connected to the servers comprising dual connected ports.

19. The apparatus of claim 15 wherein the apparatus is configured for connection to the switch via a virtual port channel.

20. The apparatus of claim 19 wherein the mask comprises said server facing ports connected to the servers comprising dual connected ports and identified as a non-designated forwarder by the switch.

* * * * *